US012702135B2

(12) United States Patent
Karring et al.

(10) Patent No.: US 12,702,135 B2
(45) Date of Patent: Aug. 11, 2026

(54) MITIGATION OF AMMONIA, ODOR AND GREENHOUSE GASES

(71) Applicants: Syddansk Universitet, Odense M (DK); Aarhus Universitet, Aarhus C (DK)

(72) Inventors: Henrik Karring, Odense SØ (DK); Simon Svane, Årslev (DK); Jens Jakob Sigurdarson Gade, Skagaströnd (IS); Michael Jørgen Hansen, Skanderborg (DK); Frederik Rask Dalby, Risskov (DK); Anders Feilberg, Ry (DK)

(73) Assignees: Syddansk Universitet, Odense M (DK); Aarhus Universitet, Aarhus C (DK)

( * ) Notice: Subject to any disclaimer, the term of this patent is extended or adjusted under 35 U.S.C. 154(b) by 1106 days.

(21) Appl. No.: 17/618,136

(22) PCT Filed: Feb. 3, 2020

(86) PCT No.: PCT/EP2020/052622
§ 371 (c)(1),
(2) Date: Dec. 10, 2021

(87) PCT Pub. No.: WO2020/249268
PCT Pub. Date: Dec. 17, 2020

(65) Prior Publication Data

US 2022/0295797 A1 Sep. 22, 2022

(30) Foreign Application Priority Data

Jun. 12, 2019 (EP) .................................... 19179648

(51) Int. Cl.
*A01N 59/10* (2006.01)
*A01N 43/16* (2006.01)
(Continued)

(52) U.S. Cl.
CPC ............ *A01N 59/10* (2013.01); *A01N 43/16* (2013.01); *A01P 1/00* (2021.08); *C05F 3/00* (2013.01);
(Continued)

(58) Field of Classification Search
CPC . A01N 59/10; A01N 43/16; A01P 1/00; C05F 3/00; C05F 11/00; C05G 3/90;
(Continued)

(56) References Cited

U.S. PATENT DOCUMENTS 1,769,189 A 7/1930 Rice
3,388,989 A * 6/1968 Sor ........................ C05C 9/005 71/64.11
(Continued)

FOREIGN PATENT DOCUMENTS

CN 106673856 A * 5/2017 ............... C05G 5/30
CN 108754474 A * 11/2018
(Continued)

OTHER PUBLICATIONS

Espacenet translation of Wang (CN-108754474-A).*
(Continued)

*Primary Examiner* — Amber R Orlando
*Assistant Examiner* — Heather Elise Silva Rainbow
(74) *Attorney, Agent, or Firm* — Klarquist Sparkman, LLP

(57) ABSTRACT

Fertilizer compositions comprising urea and a mixture comprising one or more tannins, preferably tannic acid, and fluoride selected from the group consisting of sodium fluoride (NaF), potassium fluoride (KF), lithium fluoride (LiF) and combinations thereof are provided. Methods for mitigating ammonia, production and/or ammonia emissions
(Continued)

and/or for mitigating the transition of urea to ammonia in a composition with the compositions are also provided.

12 Claims, 5 Drawing Sheets

(51) Int. Cl.

| | |
|---|---|
| ***A01P 1/00*** | (2006.01) |
| ***C05F 3/00*** | (2006.01) |
| ***C05G 3/90*** | (2020.01) |
| ***C05G 5/27*** | (2020.01) |
| ***C11D 3/00*** | (2006.01) |
| ***C11D 3/04*** | (2006.01) |
| ***C11D 3/32*** | (2006.01) |
| ***C11D 3/382*** | (2006.01) |

(52) U.S. Cl.
CPC ................. *C05G 3/90* (2020.02); *C05G 5/27* (2020.02); *C11D 3/0068* (2013.01); *C11D 3/046* (2013.01); *C11D 3/32* (2013.01); *C11D 3/382* (2013.01)

(58) Field of Classification Search
CPC ........ C05G 5/27; C11D 3/0068; C11D 3/046; C11D 3/32; C11D 3/382; Y02E 50/30
See application file for complete search history.

(56) References Cited

U.S. PATENT DOCUMENTS

| | | | | |
|---|---|---|---|---|
| 4,957,063 | A | 9/1990 | Heitfeld et al. | |
| 5,097,799 | A | 3/1992 | Heitfeld et al. | |
| 8,137,660 | B1 | 3/2012 | Whitehead et al. | |
| 2007/0212384 | A1 | 9/2007 | Ledgard | |
| 2011/0219834 | A1 | 9/2011 | Gres | |
| 2019/0177671 | A1 * | 6/2019 | Parson | C11D 1/008 |
| 2021/0363073 | A1 * | 11/2021 | Nguyen | C05G 3/30 |

FOREIGN PATENT DOCUMENTS

| | | | | |
|---|---|---|---|---|
| EP | 0451435 | A1 * | 10/1991 | A01N 33/22 |
| JP | 2000225181 | A1 | 8/2000 | |
| WO | WO 2019/049100 | | 3/2019 | |

OTHER PUBLICATIONS

Machine translation of Haltmeier EP 0451435 A1.*
Machine Translation of Tan CN-106673856-A.*
Machine translation of Haltmeier EP 0451435 A1 (Year: 1991).*
Machine Translation of Tan CN-106673856-A (Year: 2017).*
Chen et al., "Report of 18 Cases of Tooth Hypersensitivity Treated with Sodium Fluoride Tannic Acid," *FJ Medical Journal*, vol. 19, No. 1., p. 139, 1997 (includes English translation).
Banasiak et al., "Removal of boron, fluoride and nitrate by electrodialysis in the presence of organic matter," *Journal of Membrane Science*, vol. 334, No. 1-2, pp. 101-109, 2009.
International Search Report and Written Opinion, PCT/EP2020/052622, dated May 8, 2020 (14 pages).
International Preliminary Report on Patentability, PCT/EP2020/052622, dated Dec. 14, 2021 (7 pages).
Patra et al., "Ureases in the gastrointestinal tracts of ruminant and monogastric animals and their implication in urea-N/ammonia metabolism: A review," *Journal of Advanced Research*, vol. 13, pp. 39-50, 2018.
Pearson et al., "The Utilization of Urea in the Bovine Rumen. 2. The Conversion of Urea to Ammonia," *Biochem J.* vol. 37, No. 1, pp. 148-153, 1943.
Todd et al., "Fluoride inhibition of *Klebsiella aerogenes* urease: mechanistic implications of a pseudo-uncompetitive, slow-binding inhibitor," *Biochemistry*, vol. 39, No. 18, pp. 5389-5396, 2000.
Zwietering et al., "Modeling of the bacterial growth curve, *Applied and Environmental Microbiology*," vol. 56, No. 6, pp. 1875-1881, 1990.
Barszcz et al., "Effects of dietary level of tannic acid and protein on internal organ weights and biochemical blood parameters of rats," *PloS One*, vol. 13, No. 1, p. e0190769 (9 pages) 2018.

* cited by examiner

MITIGATION OF AMMONIA, ODOR AND GREENHOUSE GASES

CROSS REFERENCE TO RELATED APPLICATIONS

This is the § 371 U.S. National Stage of International Application No. PCT/EP2020/052622, filed Feb. 3, 2020, which was published in English under PCT Article 21(2), which in turn claims the benefit of European Patent Application No. 19179648.1, filed Jun. 12, 2019, which is incorporated herein by reference in its entirety.

TECHNICAL FIELD OF THE INVENTION

The present invention relates to compositions comprising tannins and fluoride, which can significantly reduce the ammonia, methane and odour emissions. In particular, the invention relates to mitigating ammonia production from animal manure using a composition comprising tannic acid and NaF.

BACKGROUND OF THE INVENTION

Industrial agriculture produces large amounts of manure slurry (mixture of livestock faeces and urine) from intensive animal productions. The manure slurry is generally used as fertilizer on fields or for biogas production. Biogenic gaseous emissions from manure slurry give rise to numerous environmental and societal concerns. E.g. emitted ammonia ($NH_3$) represent an economic challenge in crop farming, causing a loss of fertilizer nitrogen, and is deposited in nearby environments, causing harm to aquatic ecosystems and vegetation, and is the original source of formation of the greenhouse gas $N_2O$ via nitrification and denitrification processes. Methane is also a strong greenhouse gas causing climate changes, while odour and toxic agents such as methanethiol and hydrogen sulfide emitted from the manure/manure slurry affect the local society and cause human health problems.

The current technologies available to mitigate emissions of ammonia and other biogenic gases from manure slurry and other organic wastes are associated with different limitations and disadvantages.

Known technologies relating to mitigating emissions of ammonia from manure slurry are acidification or urease inhibition, where the manure slurry is treated with sulfuric acid or a urease inhibitor, respectively. However, the urease inhibition strategy is difficult to apply commercially since it is far too expensive to treat manure slurry with these rather expensive synthetic compounds. The urease inhibitor N-(n-butyl) thiophosphoric triamide (NBPT) is currently applied in some synthetic urea-based fertilizer formulations to slow down hydrolysis of the urea. In contrast, acidification of manure slurry changes the equilibrium from ammonia ($NH_3$) towards non-volatile ammonium ($NH_4^+$). However, acidification does not hinder the conversion of stable urea to volatile ammonia nor does it reduce methane or odour emissions.

Bacteria which can degrade urea to ammonia are also present in many other places. Problems with ammonia and odour from e.g. restrooms are caused by bacteria breaking down urea from human urine to form volatile ammonia, a problem which is often "fixed" by using toilet tabs with perfume to simply mask the smell. Cleaning agents can be used to remove the bacteria but to be effective the cleaning needs to be carried out quite often.

While humans predominantly excrete urea through urine, some urea may be excreted through sweat where it is again broken down by bacteria to form malodourous ammonia. Again, the remedy is often deodorants who either cover the smell with perfume (which can cause allergies) or kills/inhibits the bacteria naturally found on skin through anti-bacterial compounds.

Pets such as cats often urinate indoors in cat litter boxes. Cat kidneys are very efficient leading to highly concentrated urine giving rise to production of ample foul-smelling ammonia by bacteria present in cat faeces. Cat litter can be perfumed in an attempt to cover the smell but typically needs to be changed frequently. This problem also exist for other animals, which excrete waste on bedding material (e.g. horses in the stable, rodent pets in cages).

Several ureolytic bacteria such as *Streptococcus salivarius* are found in the human mouth. These bacteria form biofilms associated with dental plaque where high concentrations of ammonia is produced to increase the pH to better suit the bacteria. Ammonia in the mouth is quite toxic to the tissue and also contributes to a bad breath. Regular cleaning of the mouth using mouth wash and tooth brushing is essential in keeping a good oral hygiene.

Hence, an improved process to simultaneously mitigate emissions of ammonia and other biogenic gases from particular manure slurry and fertilizers would be advantageous, and in particular a more efficient and/or reliable and/or cheaper process to mitigate the transition of urea to ammonia in a composition and/or for in vitro inhibition of ureolytic organisms, such as bacteria, would be advantageous.

SUMMARY OF THE INVENTION

The present invention relates to the discovery that an environmentally friendly combination of tannic acid and fluoride (e.g. NaF) can synergistically reduce/mitigate the transition of urea to ammonia in a composition likely due to inhibition of ureolysis and ureolytic organisms, such as bacteria, present in the composition. Thus, the combination of tannic acid and fluoride can reduce ammonia, methane and odour emissions from e.g. animal manure slurry or urea-fertilizers in a synergistic manner. As outlined in the example section:

- Example 2 demonstrates synergistic inhibition of ammonia production in complex sample and in pure culture.
- Example 3 shows reduction in ammonia production in pig manure slurry using tannic acid and fluoride.
- Example 4 shows reduction in methane emission from pig manure slurry using tannic acid and fluoride.
- Example 5 shows reduction in odour emission from pig manure slurry using tannic acid and fluoride.
- Example 7 shows that tannic acid (TA) can be partly replaced with an unseparated/unpurified mixture of tannins (MTA).
- Example 9 shows that the pathogenic ureolytic bacterium *K. pneumoniae*, which is known to cause urinary tract infections, is inhibited by the combination of tannic acid and fluoride.
- Example 10 shows that tannic acid (TA) can be partly or completely replaced with mixed tannins (MTA), chlorogenic acid (CA), lignosulfonic acid (LS), chitosan low molecular weigth (CLMW) or green tea extract (GTE).
- Example 11 shows synergistic inhibition of ammonia production by tannic acid (TA) and acetohydroxamic acid (AHA) or mixtures of acetohydroxamic acid (AHA) and sodium fluoride (NaF).

It is hypothesized that the synergistic mechanism of tannic acid-fluoride is related to tannic acid making cell membranes porous upon binding, which allows fluoride ions to pass the membrane and inhibit urease and other metabolic enzymes. Furthermore, it is conceivable that the action of tannic acid on the cell membrane may lead to disruption of transmembrane fluoride-pump activity.

Besides the reduction of ammonia, methane, and odour in pig manure, this technology can also be applied to sewage and wastewater, other types of manure and human waste including industrial organic wastes.

Additionally, the combination of tannic acid and fluoride might be useful in developing new stabilizer formulations for urea-containing fertilizers such as synthetic urea fertilizers.

Further, the combination of tannic acid and fluoride may be used for cleaning e.g. medical devices such as catheters (see example 9).

Other relevant places where the combination of tannic acid and fluoride may find use are in and/or on toilet tabs, diapers/nappies, deodorants, such as roll-ons, mouth flush, dental floss, mouthwash, cleaning agents, beddings, and litter, such as cat or other pet litter.

Thus, an object of the present invention relates to the provision of an environmentally friendly and safe composition, which can significantly reduce the ammonia, methane and odour emissions from e.g. animal manure slurry or urea-comprising fertilizers.

Advantages of Tannic acid/Fluoride (T/F) treatment compared to acidification are:

- T/F treatment reduces the methane and odour emission from manure slurry concurrently with ammonia emission reduction. Acidification does not affect odour and methane emission.
- T/F treatment maintains the nitrogen in the non-volatile and very stable urea-form while the ammonium in acidified manure is easily converted into volatile ammonia when the pH increases on field application—considerably less ammonia is expected to evaporate from the fields after the T/F treated manure slurry is applied and the plants may take up more of the nitrogen.
- T/F treatment is likely more environmentally friendly (tannic acid is a natural product and due to the observed synergy-effect a very low concentration of F is required compared to inhibition by F alone).
- Acidification is not allowed in organic farming.
- Some countries do not allow manure acidification because they state that the sulfuric acid e.g. increase soil phosphate leaching due to anion-exchange with sulfate.
- The T/F mixture can be delivered to the farmer as powder/tablets/pellets, while sulfuric acid is a liquid. A T/F solid will be far safer to transport and handle than liquid concentrated acid. This may open up for the possibility that the farmer can add the T/F mixture manually to the manure slurry without investing in a very expensive acidification system.
- Tannic acid is a generic antimicrobial compound and may also kill/inhibit some of the microorganisms present in the manure slurry, which potentially can reduce the overall amount of microorganisms including pathogenic bacteria.

Thus, one aspect of the invention relates to a composition comprising

- one or more tannins, preferably tannic acid; and
- fluoride, preferably sodium fluoride (NaF).

Another aspect of the present invention relates to a coating composition comprising the composition according to the invention (tannins and fluoride), such as a coating for fertilizers such as fertilizers comprising urea. Alternatively e.g. for a coating on beddings or litter.

The two components of the composition may also be in separate containers before used. Thus, yet another aspect of the present invention is to provide a kit of parts (or system) comprising

- a first container comprising fluoride (NaF);
- a second container comprising tannins, preferably tannic acid; and
- optionally instructions for use in a process for mitigating ammonia production and/or ammonia emissions, mitigating methane production and/or methane emissions and/or mitigating odour production and/or odour emission, such as from manure slurry and/or fertilizers.

Different uses can also be foreseen. Thus still another aspect of the present invention relates to

- the use of a composition according to the invention, the coating according to the invention, or the kit according to the invention for mitigating ammonia production and/or ammonia emissions, mitigating methane production and/or methane emissions and/or mitigating odour production and odour emission, such as from manure slurry and/or fertilizers;
- and/or
- the use of a composition according to the invention or coating composition according to the invention as a coating for fertilizers, such as urea-comprising fertilizers;
- and/or
- the use of a composition according to the invention or coating composition according to claim the invention or kit according to the invention, for mitigating the transition of urea to ammonia in a composition and/or for in vitro inhibition of ureolysis and ureolytic organisms, such as bacteria, archaea, plants and/or fungi.

A further aspect of the invention relates to a process for mitigating ammonia production and/or ammonia emissions, mitigating methane production and/or methane emissions and/or mitigating odour production and odour emission from a composition, such as from manure slurry and/or fertilizers, the process comprising adding tannins and fluoride to said composition, preferably, tannic acid and NaF.

As further outlined in the example section, example 10 and 11 demonstrate a possible replacement or partly replacement of tannic acid and/or fluoride with other components. Accordingly, the present invention also relates to a further aspect being a composition comprising

- one or more tannins such as tannic acid (TA) or mixtures of tannins like green tea extract (GTE) or mixed tannins from chestnut (MTA), preferably tannic acid (TA); chitosan low molecular weight (CLMW), lignosulfonic acid (LS), lignin (L) and/or chlorogenic acid (CA); and
- fluoride, preferably sodium fluoride (NaF), potassium fluoride (KF) and lithium fluoride (LiF); and/or acetohydroxamic acid (AHA).

Figure 1:
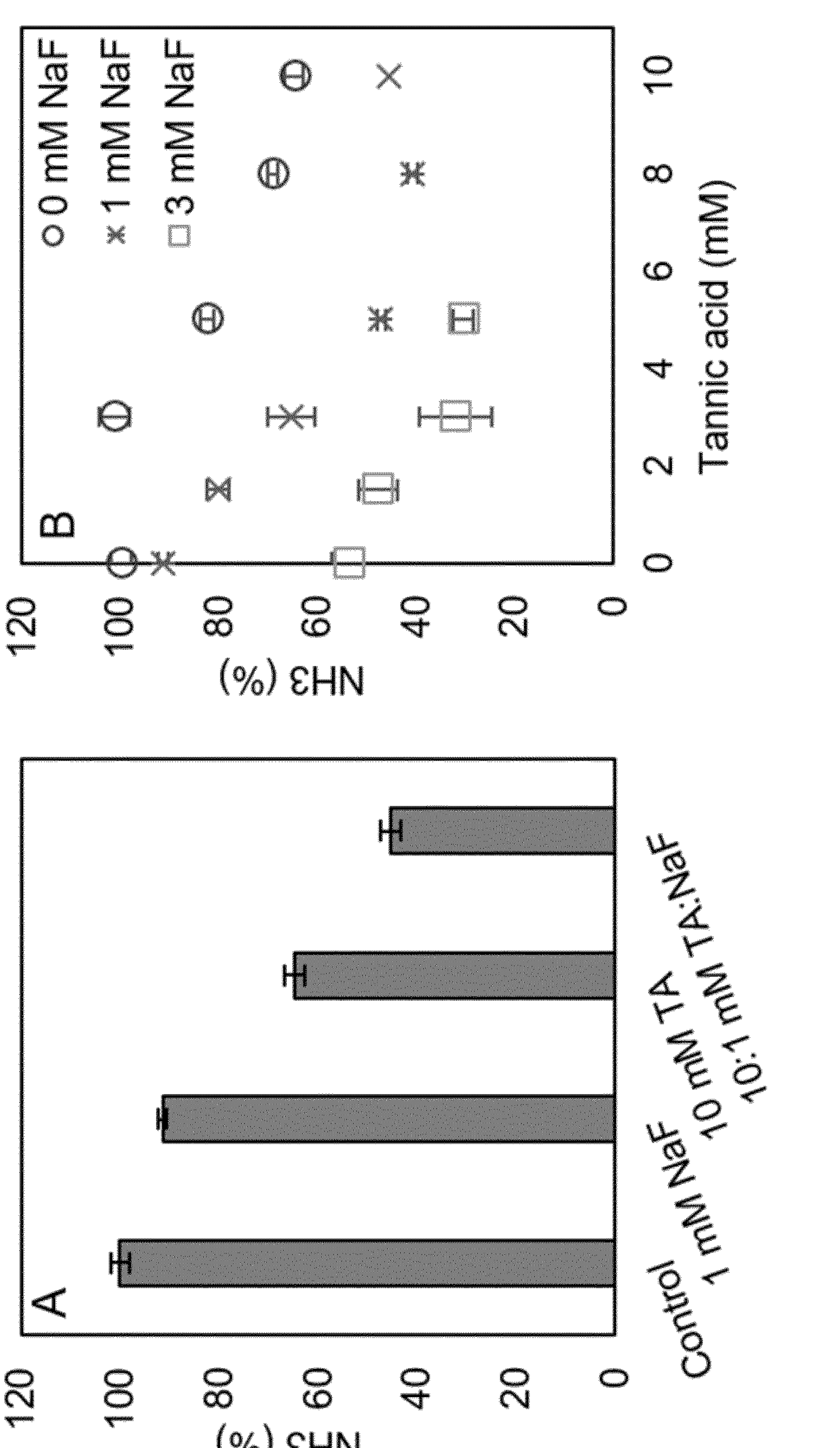
FIG. 1 shows synergy between Tannic acid and Fluoride. A) Concentration of $NH_3$ (as % of uninhibited control) in fresh pig manure after incubation at 25° C. for 5 hours in the presence of Tannic acid (TA) and Fluoride (NaF). B) Concentration of $NH_3$ (as % of uninhibited control) with increasing tannic acid concentration in fresh pig manure after incubation at 25° C. for 5 hours.

The present invention will now be described in more detail in the following.

DETAILED DESCRIPTION OF THE INVENTION

Definitions

Prior to discussing the present invention in further details, the following terms and conventions will first be defined:

Ureolytic

In the present context, the term "ureolytic" relates to an organisms ability to degrade urea into ammonia, a process called ureolysis. Thus, "ureolytic bacteria/microorganisms" relates to bacteria/microorganisms, which can degrade urea into ammonia.

Mixed Tannins (Tannins)

Mixed tannins are extract of tannins such as from chestnut. Tannins are plant polyphenols with the above extract containing an uncharacterized mix of different size polyphenols. It is not possible to state the ratios of condensed and hydrolysable tannins present in the mix nor the average molecular weight.

Tannic Acid

Tannic acid is a specific form of hydrolysable tannin, a type of polyphenol. Its weak acidity (pKa around 6) is due to the numerous phenol groups in the structure. The chemical formula for commercial tannic acid is often given as $C_{76}H_{52}O_{46}$, which corresponds to decagalloyl glucose or gallotannic acid (molar mass 1701.19 g/mol). Depending on the plant source used for extracting the tannic acid it is often a mixture of polygalloyl glucoses or polygalloyl quinic acid esters with the number of galloyl moieties per molecule ranging from 2 up to 12. Commercial tannic acid is usually extracted from any of the following plant parts: Tara pods (*Caesalpinia spinosa*), gallnuts from *Rhus semialata* or *Quercus infectoria* or Sicilian Sumac leaves (*Rhus coriaria*).

Composition

As also outlined above, the present invention relates to the surprising discovery that a combination of tannins and fluoride has a synergistic inhibitory effect on the conversion of urea to ammonia, likely caused by ureolytic bacteria. Such composition could be foreseen to be used as an additive to be mixed into manure/slurry to reduce ammonia production. Thus, an aspect of the invention relates to a composition comprising

- one or more tannins, preferably tannic acid; and
- fluoride, preferably sodium fluoride (NaF) or potassium fluoride (KF).

As also shown e.g. in examples 2-5 the combination of tannic acid and fluoride has a synergistic inhibitory effect on ammonia production, methane emission and odour emission from manure slurry.

In an embodiment, tannin is selected from the group consisting of tannic acid and Mixed Tannins (MTA), preferably tannic acid. Besides having tested tannic acid (see e.g. examples 2-5), it is also possible to use mixed tannins (example 7).

In a further embodiment, tannin is selected from the group consisting of tannic acid and Mixed Tannins either as unseparated mixtures of tannins (MTA) or unpurified mixtures of tannins e.g. from green tea extract (GTE), preferably tannic acid. Besides having tested tannic acid (see e.g. examples 2-5), it is also possible to use mixed tannins (example 7 and 10).

The source of fluoride in the combination may be derived from different sources. Thus, in an embodiment, said fluoride is selected from the group consisting of NaF, KF, and LiF or combinations thereof, preferably NaF.

The concentration of fluoride and tannins may vary. Thus, in a further embodiment, the composition comprises:

- fluoride in the range 0.01 mM-1 M, such as 0.1 mM-0.5 M; and/or
- tannins in the range 0.01 mM-0.5 M, such as 0.1 mM-0.25 M.

Since, the composition in one use may be mixed into manure/slurry, it is considered important to have as high a concentration as possible, to make transportation easier (lighter).

In yet an embodiment, the composition comprises:

- NaF in the range 0.01 mM-1 M, such as 0.1 mM-0.5 M; and/or
- tannic acid in the range 0.01 mM-0.5 M, such as 0.1 mM-0.25 M.

As also outlined in the example section, the ratio between tannins and fluoride may also be optimized. Thus, in an embodiment the molar ratio between tannins and the fluoride is in the range 100:1-1:100, such as 100:1-1:5, such as 50:1-1:1, such as 20:1-1:1, or such as 15:1-3:1. In a related embodiment, the molar ratio between tannic acid and the fluoride is in the range 100:1-1:100, such as 50:1-1:1, such as 20:1-1:1, or such as 15:1-3:1.

The present invention also relates to the surprising discovery as outlined in examples 10-11 that the combination of e.g. tannic acid, green tea extract, mixed tannins from chestnut, low molecular weight chitosan and/or chlorogenic acid; and fluoride and/or acetohydroxamic acid have a synergistic inhibitory effect on ammonia production and ureolytic activity from manure slurry. Thus, another aspect of the invention relates to a composition comprising

- one or more tannins such as tannic acid (TA) or mixtures of tannins like green tea extract (GTE) or mixed tannins from chestnut (MTA), preferably tannic acid (TA); chitosan low molecular weight, lignosulfonic acid (LS), lignin (L) and/or chlorogenic acid (CA); and
- fluoride, preferably sodium fluoride (NaF), potassium fluoride (KF) and lithium fluoride (LiF), and/or acetohydroxamic acid (AHA).

Tannic acid may beneficially be replaced by mixtures of tannins such as green tea extract (40% epigallocatechin gallate) (GTE), mixed tannins from chestnut (MTA); or chitosan (low molecular weight) (CLMW) or chlorogenic acid (CA) and still exhibit a synergistic inhibitory effect on ammonia production in combination with fluoride such as sodium fluoride (NaF), potassium fluoride (KF) and/or lithium fluoride (LiF).

In one embodiment, the composition comprises fluoride and green tea extract (GTE). In a further embodiment, the composition comprises fluoride and mixed tannins from chestnut (MTA). In a still further embodiment, the composition comprises fluoride and chitosan low molecular weight (CLMW). In an even further embodiment, the composition comprises fluoride and chlorogenic acid (CA).

In one embodiment, the composition comprises NaF and GTE. In a further embodiment, the composition comprises NaF and MTA. In a still further embodiment, the composition comprises NaF and CLMW. In an even further embodiment, the composition comprises NaF and CA.

Alternatively, the tannic acid may be partly replaced by mixtures of tannins such as green tea extract (40% epigallocatechin gallate) (GTE) or mixed tannins from chestnut (MTA); or chitosan (low molecular weight) (CLMW) or lignosulfonic acid (LS) and still exhibit a synergistic inhibitory effect on ammonia production in combination with fluoride such as sodium fluoride, potassium fluoride and/or lithium fluoride. Alternatively, the tannic acid may be partly replaced by chlorogenic acid (CA). Alternatively, the tannic acid may be partly replaced by lignin (L). Replacing tannic acid with other compounds completely or partly results in a cheaper and more readily available product.

In one embodiment, the composition comprises fluoride, tannic acid (TA) and green tea extract (GTE). In a further embodiment, the composition comprises fluoride, tannic acid (TA) and mixed tannins from chestnut (MTA). In a still further embodiment, the composition comprises fluoride, tannic acid (TA) and chitosan low molecular weight (CLMW). In a still further embodiment, the composition comprises fluoride, tannic acid (TA) and lignosulfonic acid (LS). In an even further embodiment, the composition comprises fluoride, tannic acid (TA) and chlorogenic acid (CA). In an even further embodiment, the composition comprises fluoride, tannic acid (TA) and lignin (L).

In one embodiment, the composition comprises NaF, TA and GTE. In a further embodiment, the composition comprises NaF, TA and MTA. In a still further embodiment, the composition comprises NaF, TA and CLMW. In a still further embodiment, the composition comprises NaF, TA and LS. In an even further embodiment, the composition comprises NaF, TA and CA.

Yet another aspect of the invention relates to a composition comprising

- one or more tannins such as tannic acid (TA) or mixtures of tannins like green tea extract (GTE) or mixed tannins from chestnut (MTA), preferably tannic acid (TA); chitosan low molecular weight, lignosulfonic acid, lignin and/or chlorogenic acid; and
- fluoride, preferably sodium fluoride (NaF) or potassium fluoride (KF).

In one embodiment, the composition comprises a mixture of tannic acid and one of the components: green tea extract, mixed tannins from chestnut, chitosan low molecular weight or lignosulfonic acid. In a further embodiment, the composition comprises a mixture of tannic acid and one of the components: green tea extract, mixed tannins from chestnut, chitosan low molecular weight, chlorogenic acid or lignosulfonic acid.

Yet another aspect of the invention relates to a composition comprising

- one or more tannins, preferably tannic acid; and
- fluoride, preferably sodium fluoride (NaF), potassium fluoride (KF) or lithium fluoride (LiF) and/or acetohydroxamic acid (AHA).

In one embodiment, the composition comprises TA and AHA.

Fluoride and acetohydroxamic acid may advantageously be combined and still exhibit a synergistic effect on the reduction of ammonia. Hereby, high concentrations of either of the compounds may be avoided. Furthermore, as demonstrated in example 11, an additional positive effect is obtained by mixing of the two compounds. Thus, in one embodiment the composition comprises TA, AHA and NaF.

In one embodiment, the molar ratio between fluoride and acetohydroxamic acid is in the range 10:1-1:10, such as 5:1-1:5, like 3:1-1:3, such as 1:1.

In yet an embodiment, the composition comprises:

- NaF in the range 0.01 mM-1 M, such as 0.1 mM-0.5 M;
- AHA in the range 0.01 mM-1 M, such as 0.1 mM-0.5 M;
- tannic acid in the range 0.01 mM-0.5 M, such as 0.1 mM-0.25 M
- green tea extract in the range 0.1 mg/ml-100 mg/ml, such as 1 mg/ml-50 mg/ml, like 1 mg/ml-10 mg/ml;
- mixed tannins from chestnut in the range 0.1 mg/ml-100 mg/ml, such as 1 mg/ml-50 mg/ml, like 1 mg/ml-10 mg/ml;
- low molecular weight chitosan in the range 0.01 mg/ml-100 mg/ml, such as 0.1 mg/ml-50 mg/ml, like 0.1 mg/ml-10 mg/ml, such as 0.5 mg/ml-5 mg/ml;
- chlorogenic acid in the range 0.1 mM-100 mM, such as 1 mM-50 mM, like 1 mM-10 mM, such as 3 mM -5 mM; and/or
- lignosulfonic acid in the range 0.01 mg/ml-100 mg/ml, such as 0.1 mg/ml-50 mg/ml, like 1 mg/ml-10 mg/ml.

In an embodiment the molar ratio between the sum of tannins such as tannic acid (TA) or mixtures of tannins like green tea extract (GTE) or mixed tannins from chestnut (MTA), preferably tannic acid (TA); chitosan low molecular weight, lignosulfonic acid and/or chlorogenic acid and the fluoride is in the range 100:1-1:100, such as 50:1-1:1, such as 20:1-1:1, or such as 15:1-3:1, such as 1:1-1:50, such as 1:1-1:20, such as 1:3-1:15, such as 50:1-1:50, such as 15:1-1:15.

It could be foreseen that the composition preferably is in a dry state, again e.g. to make transportation and storage easier. Thus, in another embodiment said composition is in dry state, such as having a water content below 13% (w/w), such as below 10%, such as below 5% or below 1%. In a related embodiment, said dry state is selected from the group consisting of powder, tablets and pellets, such as fertilizer powder, fertilizer tablets or fertilizer pellets.

In an alternative situation the composition may be in solution, e.g. for easy mixing. Thus, in an embodiment, said composition is in a solution.

Fertilizers may comprise urea. To maintain a high level of N in the fertilizer and thus avoid transition of urea to ammonia, the composition of the invention could be used in synthetic urea fertilizers for example as a coating to slow down hydrolysis of the urea so that the plants can use it. Thus, in yet an embodiment, said composition is in the form of a fertilizer, such as a urea-comprising fertilizer. In a related embodiment, said fertilizer further comprises 4-90% (w/w) nitrogen, preferably 10-46% (w/w); and/or 2-99% (w/w) urea, such as 20-80% (w/w).

Many different products could comprise the composition according to the invention. Thus, in a further embodiment, the composition is in and/or on a product selected from the group consisting toilet tabs, diapers, deodorants, such as roll-ons, mouth flush, dental floss, cleaning agents, beddings, and litter, such as cat litter. All of these products may come in contact with urea-comprising material for example urine or saliva (and ureolytic bacteria) and thus breakdown of urea to ammonia can take place.

To further enhance the effect of the composition, other components could be included in the composition. Thus, in an embodiment, the composition comprises a urease inhibitor, such as NBPT, NPPT or analogues thereof, and/or a nitrification inhibitor, such as DCD. In an embodiment, the composition further comprises mixed tannins. As outlined in example 7, mixed tannins/polyphenols may substitute for some of the tannic acid used, thereby reducing costs.

In another embodiment, the composition further comprises a binder, such as a wax or resin, polymers, sulphur, urease inhibitors, such as NBPT, NPPT or analogues thereof, nitrification inhibitors, such as DCD.

Coating

The composition according to the invention could also be used as a coating on different products, to maintain urea in the coated composition. Thus, an aspect of the invention relates to a coating composition comprising the composition according to the invention, such as a coating for fertilizers such as fertilizers comprising urea or for a coating on beddings or litter.

In an embodiment, the composition or coating composition further comprises a binder, such as a wax or resin, polymers, sulphur, urease inhibitors, such as NBPT, NPPT or analogues thereof, nitrification inhibitors, such as DCD.

In yet an embodiment, the invention relates to a fertilizer such as a urea-fertilizer, a bedding or a litter comprising a coating of a coating composition according to the invention.

Kit of Parts

The two components of the composition according to the invention could also form part of a kit (system) where each component is stored in individual containers before use, such as before mixing with manure/manure slurry. Thus, another aspect of the invention relates to a kit (or system) of parts comprising

- a first container comprising fluoride (e.g. NaF);
- a second container comprising tannins, preferably tannic acid; and
- optionally instructions for use in a process for mitigating ammonia production and/or ammonia emissions, mitigating methane production and/or methane emissions and/or mitigating odour production and/or odour emission, such as from manure slurry and/or fertilizers.

Yet another aspect of the invention relates to a kit (or system) of parts comprising

- a first container comprising fluoride (e.g. NaF) and/or acetohydroxamic acid (AHA);
- a second container comprising tannins such as tannic acid (TA) or mixtures of tannins like green tea extract (GTE) or mixed tannins from chestnut (MTA), preferably tannic acid (TA); chitosan low molecular weight, lignosulfonic acid, lignin and/or chlorogenic acid; and
- optionally instructions for use in a process for mitigating ammonia production and/or ammonia emissions, mitigating methane production and/or methane emissions and/or mitigating odour production and/or odour emission, such as from manure slurry and/or fertilizers.

In an embodiment, the component(s) of the first container is in solution or solid form and/or the component(s) of the second container is in solution or in solid form. In an embodiment, NaF is in solution or solid form and/or tannic acid is in solution or in solid form.

Uses

The composition, coating composition and kit (system) according to the invention may have many different uses. Thus, an aspect of the invention relates to the use of a composition according to the invention, the coating according to the invention or the kit according to the invention for mitigating ammonia production and/or ammonia emissions, mitigating methane production and/or methane emissions and/or mitigating odour production and odour emission, such as from manure slurry and/or fertilizers.

Yet an aspect relates to the use of a composition according to the invention or the coating composition according to the invention as a coating for fertilizers, such as urea-comprising fertilizers.

Yet another aspect relates to the use of a composition according to the invention or coating composition according to the invention or the invention for mitigating ammonia production and/or ammonia emissions from fertilizers, especially urea-containing fertilizers.

Yet a further aspect relates to the use for mitigating nitrogen losses in organic fertilizers and/or mineral/synthetic fertilizers and/or on harvest residues and/or on grazing areas and/or during storage of liquid manure and/or for lowering the ammonia load in livestock housings.

Another aspect relates to the use of a composition according to the invention or coating composition according to the invention or kit according to the invention, for mitigating the transition of urea to ammonia in a composition.

Yet another aspect relates to the use of a composition according to the invention, the coating according to the invention or the kit according to the invention for mitigating methane production and/or methane emissions, such as from manure slurry and/or fertilizers, wherein the molar ratio between tannins and the fluoride is 100:1 to 3:1.

Yet another aspect relates to the use of a composition according to the invention, the coating according to the invention or the kit according to the invention for mitigating methane production and/or methane emissions, such as from manure slurry and/or fertilizers, wherein concentration of tannins is at least 3 mM.

Yet another aspect relates to the use of a composition according to the invention or coating composition according to the invention or kit according to the invention, for in vitro inhibition of ureolytic organisms, such as bacteria, archaea, plants and/or fungi. In an embodiment, the ureolytic bacteria is selected from the group consisting of *Klebsiella pneumonia, Streptococcus salivarius, Proteus mirabilis, Helicobacter pylori*. Example 9 shows inhibition of the pathogenic ureolytic bacterium *K. pneumoniae* by a combination of tannic acid and fluoride. *K. pneumoniae* is known to cause urinary tract infections. Yet an embodiment relates to the use for surfaces of medical devices such as catheters.

In an embodiment, the use is in and/or on toilet tabs, diapers/nappies, deodorants, such as roll-ons, mouth flush, dental floss, mouthwash, cleaning agents, beddings, and litter, such as cat and other pet litter.

The composition, coating composition and kit (system) according to the invention may have many different uses. Thus, an aspect of the invention relates to a composition according to the invention, the coating according to the invention or the kit according to the invention for use in preventing, ameliorate and/or treating urinary tract infections and/or cystitis and/or infections caused by ureolytic bacteria/microorganisms.

In one embodiment, said urinary tract infection and/or cystitis is caused by ureolytic bacteria/microorganisms such as *K. pneumonia*.

Process for Mitigating Ammonia Production and/or Ammonia Emissions

As outlined above, the composition, coating and kit according to the invention, may mitigate ammonia emissions from manure slurry. Thus, an aspect of the invention relates to a process for mitigating ammonia production and/or ammonia emissions, mitigating methane production and/or methane emissions and/or mitigating odour production and odour emissions from a composition, such as from manure slurry and/or fertilizers, the process comprising adding tannins and fluoride to said composition, preferably, tannic acid and NaF.

Another aspect of the invention relates to a process for mitigating methane production and/or methane emissions, such as from manure slurry and/or fertilizers, the process comprising adding tannins and fluoride to said composition, preferably, tannic acid and NaF, wherein the molar ratio between tannins and the fluoride is 100:1 to 3:1.

Another aspect of the invention relates to a process for mitigating methane production and/or methane emissions, such as from manure slurry and/or fertilizers, the process comprising adding tannins and fluoride to said composition, preferably, tannic acid and NaF, wherein the concentration of tannins is at least 3 mM.

In an embodiment, the composition is manure, such as pig manure or slurry, cattle manure or slurry, poultry manure or slurry, mink manure or slurry.

In another embodiment,

- said tannins are added to the composition to a final concentration in the range 0.01 mM-100 mM, such as 0.1-10 mM; and/or
- said fluoride is added to the composition to a final concentration in the range 0.03 mM-100 mM, such as 0.3-10 mM or such as 1-6 mM; and/or
- said tannins and fluoride is added to a final molar ratio between tannins and fluoride in the range 100:1-1:100, such as 50:1-1:1, such as 20:1-1:1, or such as 15:1-3:1; and/or
- tannic acid and fluoride is added to a molar ratio between tannic acid and fluoride in the range 100:1-1:100, such as 50:1-1:1, such as 20:1-1:1, or such as 15:1-3:1.

In an additional aspect, the invention relates to a process for mitigating ammonia production and/or ammonia emissions, mitigating methane production and/or methane emissions and/or mitigating odour production and odour emissions from a composition, such as from manure slurry and/or fertilizers, the process comprising adding one or more tannins such as tannic acid (TA) or mixtures of tannins like green tea extract (GTE) or mixed tannins from chestnut (MTA), preferably tannic acid (TA); chitosan low molecular weight, lignosulfonic acid, lignin and/or chlorogenic acid; and fluoride, preferably sodium fluoride (NaF), potassium fluoride (KF) or lithium fluoride (LiF), and/or acetohydroxamic acid (AHA) to said composition.

In yet another embodiment, the composition is manure or slurry and said manure or slurry has been fully or partially separated into a liquid part and a solid part, before addition of tannins and fluoride to the liquid part. Example 8 shows inhibition in a separated slurry.

In a further embodiment, said tannins and fluoride are coated on or mixed with the composition, such as where the composition is a fertilizer, such as a urea-comprising fertilizer. Preferably, the tannin is tannic acid.

In a further embodiment, said one or more tannins such as tannic acid (TA) or mixtures of tannins like green tea extract (GTE) or mixed tannins from chestnut (MTA), preferably tannic acid (TA); chitosan low molecular weight, lignosulfonic acid and/or chlorogenic acid; in combination with fluoride, preferably sodium fluoride (NaF) or potassium fluoride (KF), and/or acetohydroxamic acid (AHA) are coated on or mixed with the composition, such as where the composition is a fertilizer, such as a urea-comprising fertilizer.

In a further embodiment, lignosulfonic acid and tannic acid in combination with sodium fluoride are coated on or mxed with the composition, such as where the composition is a fertilizer, such as a urea-comprising fertilizer.

In a further embodiment, tannic acid in combination with acetohydroxamic acid are coated on or mxed with the composition, such as where the composition is a fertilizer, such as a urea-comprising fertilizer.

In a further embodiment, mixtures of tannins such as green tea extract (GTE) in combination with sodium fluoride are coated on or mxed with the composition, such as where the composition is a fertilizer, such as a urea-comprising fertilizer.

In a further embodiment, chitosan low molecular weight and tannic acid in combination with sodium fluoride are coated on or mxed with the composition, such as where the composition is a fertilizer, such as a urea-comprising fertilizer.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1

Screening for Compounds with Anti-Ureolytic Properties

Aim of Example

To screen 71 commercially available chemical compounds for anti-ureolytic effect against pure *Klebsiella pneumoniae* culture and purified jack bean urease (JBU).

Materials and Methods

Chemicals and Equipment.

Phenylphosphorodiamidate (PPDA), 97% was purchased from Fisher Scientific (Roskilde, Denmark). N-(n-butyl) thiophosphoric triamide was purchased from Carbosynth (Compton, UK). Ethacrynic acid was purchased from Alfa Aesar (Karlsruhe, Germany). Iron(III) dimethyldithiocarbamate and 2,2'-thenoin was purchased from TCI Europe (Zwijndrecht, Belgium). All other chemicals were purchased from Sigma-Aldrich and used as received unless otherwise stated. All equipment was purchased sterile or autoclaved before use. All solutions were autoclaved or sterile filtered through sterile filters with pore size of <20 μm. All manipulations of sterile materials were carried out in a laminar flow bench. Absorbance measurements were carried out on a Varioskan LUX plate reader using flat bottom 96-well BRAND plates. Plates were sealed with optically clear AB-0812 Diamond Seal heat sealing tape using a Alps30 heat sealer prior to incubation in the plate reader. Non-linear regression analysis was performed using OriginPro 9.0 software.

Urease Enzyme and Bacteria.

*Klebsiella pneumoniae* subsp. *pneumoniae* (ATCC: 13882, DSM No.: 30102), previously known as *Klebsiella aerogenes*, was used as the urease positive bacterium for the experiments. *Escherichia coli* K12 MG1655 (ATCC: 700926, DSM No.: 18039) was used as the urease negative bacterial control. Both bacterial strains were purchased from Leibniz Institute DSMZ-German Collection of Microorganisms and Cell Cultures and were stored in 15% glycerol freezing stocks at −80° C. Purified jack bean (*Canavalia ensiformis*) urease was purchased from Sigma-Aldrich and dissolved in an aqueous 15 mM $KH_2PO_4$ solution, pH 6.8 to give a final concentration of 1.89 mg/ml, corresponding to 66.15 U/ml. The urease stock was stored at −20° C.

M9U Minimal Growth Medium.

M9 urea growth medium (M9U) consists of 2 g/l (14.7 mM) $KH_2PO_4$, 0.5 g/l (8.6 mM) NaCl, 0.012 g/l (33.9 μM) phenol red, 0.12 g/l (1 mM) $MgSO_4$, 0.011 g/l (0.1 mM) $CaCl_2$, 44.16 μg/l (0.34 μM) $NiCl_2$, 0.5 g/l (9.3 mM) $NH_4Cl$, 4 g/l (22.2 mM) D(+)-glucose, 2.4 g/l (40 mM) urea, 2.3 mg/l (20 μM) $FeCl_2$, 8.1 mg/l (50 μM) $ZnSO_4$, and 10 ml/l of BME Vitamin solution 100× (Sigma-Aldrich B6891). All M9U components except glucose, urea, $FeCl_2$, $ZnSO_4$, and vitamins were mixed, the pH adjusted to 6.8 and the medium was autoclaved. Glucose, urea, $FeCl_2$, $ZnSO_4$, and BME Vitamin solution were sterile-filtered and added aseptically after autoclaving. Urea was added within 24 h before the medium was used.

pH-Based Urease Activity Assay.

The assay consists of a buffered urea solution containing the pH indicator phenol red and the inhibitor to be tested. Stock solutions were prepared for each inhibitor with concentrations of either 100 mM or, in the case of low solubility, as concentrated as practical. Each compound was screened at three concentrations (10×, 100× and 1000× dilutions of the stock) in triplicate against *K. pneumoniae* and purified JBU. To this solution ureolytic bacteria or urease is added and the solution is incubated in a plate reader which every 15 minutes measure the absorbance at 557 nm and 630 nm (A557 and A630). Thus, inhibitor and bacteria/urease was not pre-incubated. For microbial urease activity experiments, *K. pneumoniae* and *E. coli* were grown overnight in the respective growth media. The cells were pelleted by centrifugation for 5 min at 16,000×g, the supernatant removed, and fresh media added to reach an $OD_{600}$ of 0.125 of the bacterial suspension, corresponding to a final $OD_{600}$ of 0.05 in the well. To each well 80 μl bacterial suspension, 100 μl growth media, and 20 μl inhibitor solution was added. Increase in absorbance at 557 nm reflects increasing pH (until saturation of the indicator at pH 8.2) and increase in absorbance at 630 nm reflects bacterial growth (optical density). In the case of ureolytic bacteria or enzymes in urea solution the increase in pH can be ascribed to the production of alkaline $NH_3$. To compare changes in A557 between samples with different concentrations of bacteria the A630 was subtracted from A557 as it was found that increasing bacterial growth led to an overall increase in absorbance across all wavelengths due to turbidity. In the bacterial assay inhibitors were evaluated based on three parameters: maximal or final pH increase, onset of pH increase and rate of pH increase. The relative maximal pH increase was determined as $pH_{max}$=A557-A630. The onset of the pH increase was defined as the point where the ureolytic production of $NH_3$ overcame the buffer capacity resulting in a colour change of the phenol red indicator measured as an absorbance increase at 557 nm. The rate of pH increase was found as the slope of the pH increase using a Gompertz fit as described previously (Zwietering, M. H., Jongenburger, I., Rombouts, F. M., van't Riet, K., *Modeling of the bacterial growth curve. Applied and environmental microbiology* 1990, 56, 1875-1881). For each inhibitor the influence on the bacterial growth was also evaluated by identifying the end of the lag phase (onset of exponential growth), the growth rate and the maximal OD630.

In the cell-free urease activity assays, the jack bean urease stock solution was diluted with 15 mM $KH_2PO_4$ solution at pH 6.8 to reach a concentration of 2.65 U/ml of which 5 μl was added to each well along with 195 μl growth media. In urease inhibition assays 5 μl enzyme solution, 175 μl growth media, and 20 μl inhibitor solution were added. For the enzyme assays the inhibitors were evaluated based on two parameters: the initial rate of pH increase found by linear regression of the increase in A557 during the first 90 min of incubation and the maximal pH change defined as the maximal A557. The onset of pH change was found to not be a useful parameter in enzymatic assays as the increase in A557 was generally initiated within the first two measurements (<15 min) irrespective of inhibitor type present.

Results

Out of the 71 tested compounds 30 showed more than 25% inhibition of the ureolytic activity of *Klebsiella pneumoniae* and/or jack bean urease.

Sodium fluoride (1.0 mM) reduced the ureolytic activity (pH change) of *Klebsiella pneumoniae* to 0 relative to the uninhibited control. Jack bean urease showed an 80.6±3.0% reduction of pH change and 89.4±1.0% reduction in initial rate of pH change with 1.0 mM sodium fluoride.

Tannic acid (1.0 mM) reduced the ureolytic activity (pH change) of *Klebsiella pneumoniae* with 21.3±1.3% relative to uninhibited control. Jack bean urease pH change was reduced to 0 by 0.1 mM tannic acid.

Conclusion

In the assay 42% of the screened compounds showed >25% inhibition of *Klebsiella pneumoniae* and/or jack bean urease in minimal medium among these tannic acid and sodium fluoride when applied separately.

Example 2

Demonstration of Synergistic Inhibition of Ammonia Production in Complex Sample and in Pure Culture Aim of Example Some representative compounds identified in example 1 were combined in pairs to test for potential synergistic inhibition of ammonia production in pig manure slurry. After identifying tannic acid and fluoride as responsible for synergistic inhibition in pig manure slurry the mixture was tested in pure bacteria culture to demonstrate that the synergetic inhibition of ureolytic bacteria by tannic acid (TA) and fluoride (F) observed in complex samples (pig manure slurry) is not dependent on unknown components present in the manure slurry by showing said inhibition in pure bacteria culture grown in well-characterized minimal media.

Materials and Methods

Kjeldahl Measurements.

Tannic acid, sodium fluoride, NaOH, HCl and $H_3BO_3$ were purchased from Sigma-Aldrich.

Total ammoniacal nitrogen (TAN) was measured in pig manure slurry using the Kjeldahl method. This method consists of adding 32% NaOH to the manure slurry sample in order to turn all $NH_4^+$ in the sample to $NH_3$. The sample is then heated in a closed system causing the $NH_3$ to evaporate into a trap containing $H_3BO_3$ forming $NH_4[B(OH)_4]$. The remaining acid is then back-titrated with dilute HCl to give the concentration.

The pig manure slurry was made fresh on the day of measurement by mixing 10 g of feces with 30 ml of urine. Vials of approximately 4.5 ml of manure slurry were prepared. To each vial 0.5 ml of appropriate amounts of inhibitors were added. Controls were vials of 4.5 ml manure slurry with 0.5 ml $H_2O$. After mixing inhibitors and pig manure slurry the vials were sealed and incubated at 25° C. with shaking for 5 h. After incubation, the ureolysis reaction was rapidly quenched by addition of 8 ml 32% NaOH before the sample was transferred to the Kjeldahl instrument for measurements.

Bacteria, growth-medium and pH-based urease activity assay.

Same procedure as described in example 1.

Results

The results from the screening of inhibitors in different combinations are presented in the following table.

| Component | Reduction in ammonia production |
|---|---|
| Uninhibited control | 0% |
| Tannic acid (10 mM) | 17.6% |
| Flouride (NaF) (1 mM) | 24% |
| Tannic acid (10 mM)<br>Flouride (NaF) (1 mM) | 79% |
| Cysteamine (1 mM) | 25% |
| Tannic acid (10 mM)<br>Cysteamine (1 mM) | 50% |
| Cysteamine (1 mM)<br>Flouride (NaF) (1 mM) | 34% |
| N-phenylmaleimide (3.9 mM) | 59% |
| N-phenylmaleimide (3.9 mM)<br>Tannic acid (10 mM) | 62% |
| N-phenylmaleimide (3.9 mM)<br>Cysteamine (1 mM) | 47% |
| Iminodiacetic acid (0.8 mM) | 19% |
| Iminodiacetic acid (0.8 mM)<br>Tannic acid (10 mM) | 20% |
| Iminodiacetic acid (0.8 mM)<br>Flouride (NaF) (1 mM) | 20% |
| Iminodiacetic acid (0.8 mM)<br>Cysteamine (1 mM) | 28% |

As shown in the above table, of all the tested combinations only tannic acid with fluoride showed a synergistic effect (17.6%+24%<79%). All other combinations showed only strictly additive effect or appeared to counteract each other.

Figure 5:
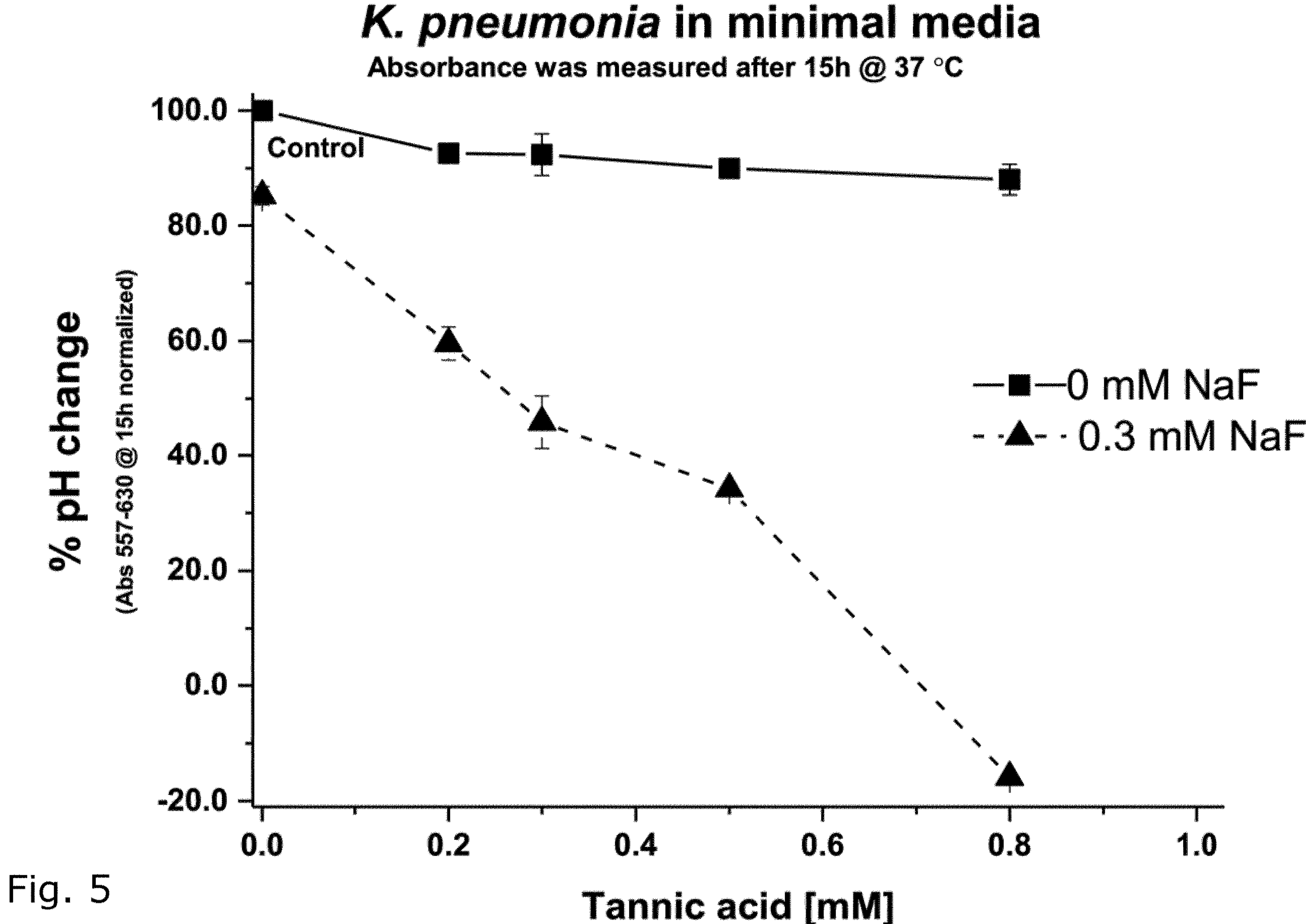
FIG. 5 shows the ureolytic pH change of pure culture *K. pneumoniae* in minimal media with different concentrations of tannic acid or TA:NaF. Tannic acid alone up to 0.8 mM does not reduce the pH change significantly compared to the uninhibited control. NaF (0.3 mM) reduces pH change with approximately 12-15% while TA:NaF induces a synergistic inhibition of the pH change with lower concentrations of TA showing the relative largest synergistic effect.

The results, given in FIG. 5, from the urease activity assay clearly show that in pure culture, tannic acid in concentrations of 0-0.8 mM inhibits ureolytic activity of *K. pneumoniae* to a small degree only (0-12%). When 0.3 mM fluoride is added to the tannic acid solution, the inhibition is dramatically enhanced (40-100%). In contrast, 0.3 mM fluoride alone inhibits ureolysis by only 14.7%.

Conclusion

In complex media (pig manure slurry), among several inhibitor combinations, only tannic acid with fluoride demonstrate synergistic inhibition of ammonia production. This indicates that the observed synergy is not trivial.

The synergetic inhibition of ureolytic ammonia production by tannic acid and fluoride observed in complex media (pig manure slurry) is demonstrated to be retained in simple media (minimal media) supporting the conclusion that the observed effect is caused by the action of tannic acid and fluoride on ureolytic bacteria and is not dependent on components of the growth media.

Example 3

Tannic Acid and Fluoride—Reduction in Ammonia Production

Aim of Example

To document the extend of the synergistic inhibition of ureolysis in pig manure slurry (measuring ammonia concentration in solution) by a mixture of tannic acid and fluoride over a range of concentrations and to show that the reduced production of ammonia led to a decrease in ammonia emissions from pig manure slurry over 12 days (reduced ammonia concentration in the headspace).

Materials and Methods

Kjeldahl Measurements.

Procedure was the same as described in example 2.

Headspace Measurements.

Ammonia emissions were measured in headspace experiments at ambient temperature (22-24° C.). Pig urine (30 ml) and 10 g of frozen pig feces were thawed and added to each of nine 100 mL reactors and mixed with tannic acid and sodium fluoride in different concentrations. Tannic acid and sodium fluoride was purchased from Sigma-Aldrich. A flow of 0.5 L±10% air/min was continuously applied to the headspace of each reactor with mass flow controllers (Bronkhorst EL-FLOW, Ruurlo, Netherlands). The air flow carried the emitted ammonia from the pig manure slurry in the reactors to a proton transfer reaction mass spectrometer (PTR-MS) (Ionicon Analytik, Innsbruck, Austria) for quantification. A PEEK valve (Bio-Chem Valve Inc., Boonton, NJ, USA) was used to switch between the nine reactors every 12 min. The PTR-MS was operated at a reduced electric field of 142 Townsend (2.15 mbar and 75° C. in the drift tube). Every 24 h, 3 ml of pig urine and 1 g of pig feces was thawed and supplemented to the reactors. Tannic acid and sodium fluoride was also supplemented every 24 h to maintain a constant inhibitor concentration in the manure. For acidification treatment, the manure slurry was acidified with $H_2SO_4$ to pH 5.5 every 24 h. The gas emissions were monitored continuously for 12 days. In total three sets of experiments consisting of nine reactors each with manure slurry treated with different doses and types of inhibitors were conducted.

Results

Reduction in ammonia production in solution:

| Component | Reduction in ammonia production |
|---|---|
| Uninhibited control | 0% |
| Tannic acid (5 mM) | 17.6% |
| Flouride (NaF) (1 mM) | 8.6% |
| Tannic acid (5 mM) | 52.9% |

-continued

| Component | Reduction in ammonia production |
|---|---|
| Flouride (NaF) (1 mM) | |
| Tannic acid (10 mM) | 35.2% |
| Tannic acid (10 mM) | 54.7% |
| Flouride (NaF) (1 mM) | |

The above results are also shown in FIGS. 1A and 1B.

Figure 2:
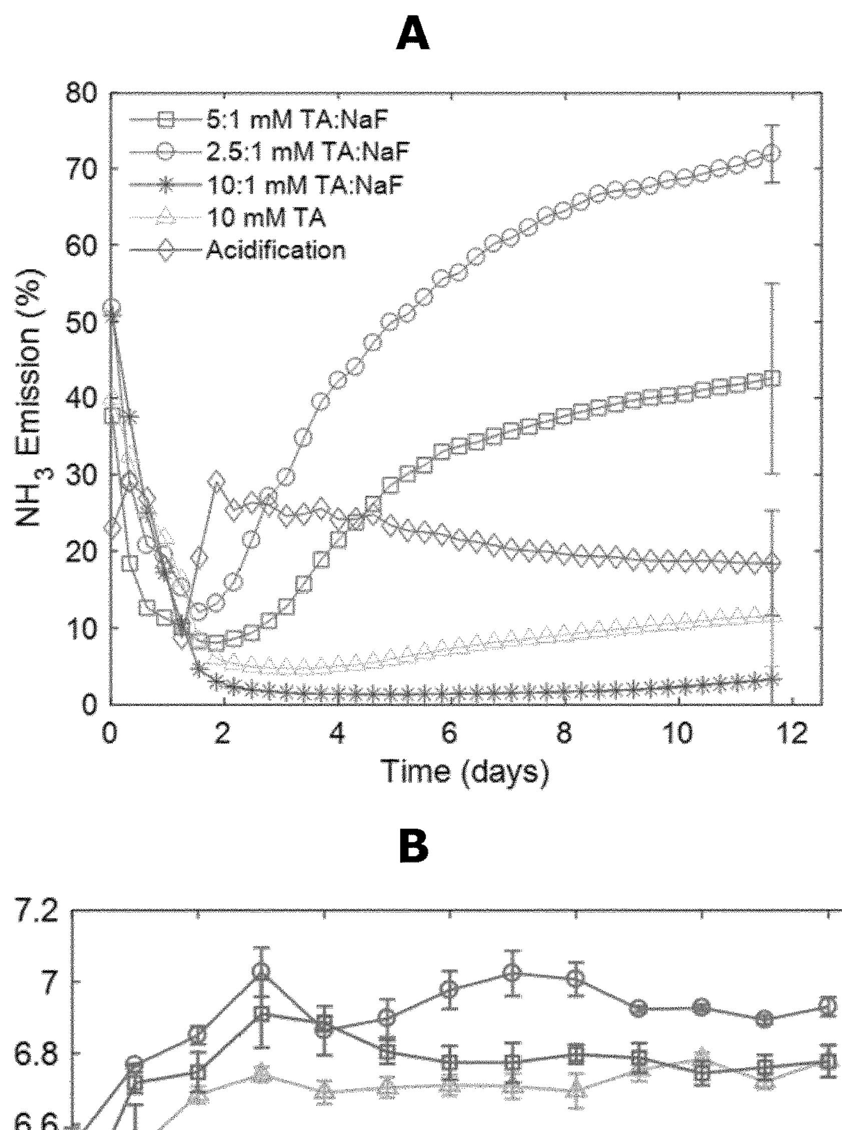
FIG. 2 shows $NH_3$ headspace emissions from fresh pig manure slurry. A) Cumulative $NH_3$ emission relative to untreated controls from fresh pig manure slurry treated with tannic acid (TA) and sodium fluoride (NaF) or acidification. B) pH values.

FIG. 2A shows the cumulated ammonia emissions of tannic acid and fluoride treated manure slurry mixtures relative to uninhibited control manure slurry. FIG. 2B shows the pH value of the tannic acid and fluoride treated manure slurry mixtures corresponding to data in FIG. 2A.

| Component | Reduction in ammonia emissions, 12 days |
|---|---|
| Uninhibited control | 0% |
| Tannic acid (10 mM) | 88.4% |
| Tannic acid (2.5 mM) | 28.1% |
| Flouride (NaF) (1 mM) | |
| Tannic acid (5 mM) | 57.5% |
| Flouride (NaF) (1 mM) | |
| Tannic acid (10 mM) | 96.7% |
| Flouride (NaF) (1 mM) | |
| Acidification to pH 5.5 | 81.6% |

Conclusion

The results clearly indicate a synergistic effect of the combination of tannic acid and fluoride in the reduction of ammonia production. Synergistic effects can be seen for combinations in the range 3-10 mM TA with 1 mM NaF though the synergy is most pronounced at lower concentrations of TA. It is worth noting that the inhibition appears to reach a plateau at high TA concentrations (5-10 mM) both with and without NaF present. If the concentration of NaF is increased to 3 mM the overall inhibition is increased. The synergy is still present but to a smaller degree.

The headspace experiments clearly indicated a strong reduction in ammonia emissions from freshly mixed pig manure slurry when treated with TA and NaF. The effect was greatest for 10 mM TA with 1 mM NaF, followed by 10 mM TA alone, acidification to pH 5.5, 5 mM TA with 1 mM NaF and 2.5 mM TA with 1 mM NaF. The ammonia emissions displayed a diurnal cycle with emission spikes every 24 h, which was a consequence of urine and feces addition. The ammonia emission peaked earlier the lower the TA concentration used. The TA-NaF treatment also reduced the pH and more so with high TA concentrations, which would also reduce the ammonia emissions. Acidification to pH 5.5 decreased the ammonia emissions as well and increased in efficacy over time in contrast to the TA-NaF inhibited manure slurry. The pH of acidified manure slurry was lower than the TA-NaF treated manure slurry, but the 10 mM TA with 1 mM NaF and the 10 mM TA treated manure slurry displayed lower ammonia emissions than the acidified manure. Consequently, the reduced ammonia emissions from TA-NaF treated manure slurry was caused by another mechanism than reduced pH.

Example 4

Tannic Acid and Fluoride—Reduction in Methane Emissions from Manure Slurry

Aim of Example

To document the reduction of methane production and emissions from pig manure slurry using a mixture of tannic acid and fluoride in a range of concentrations over 12 days.

Materials and Methods

Figure 3:
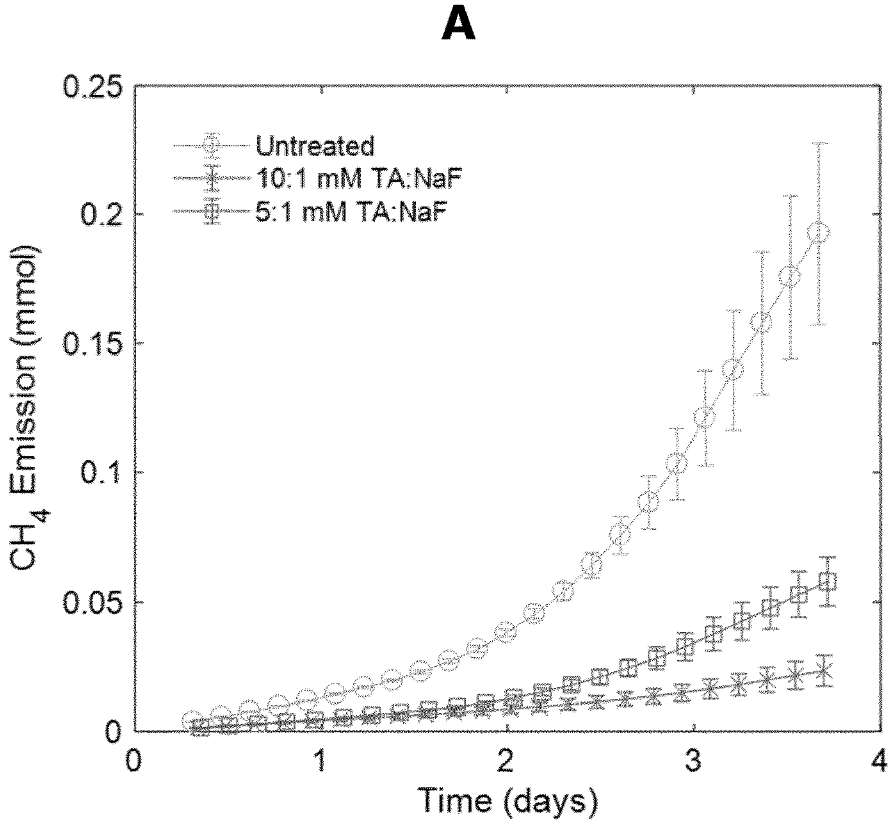
FIG. 3. Methane production from manure slurry. A) $CH_4$ emission rate from six months old pig manure treated with tannic acid (TA) and sodium fluoride (NaF). B) Relative $CH_4$ production from pig manure slurry exposed to Tannic acid (TA) and sodium fluoride (NaF) before incubation in anaerobic inoculum flask.
Figure 3:
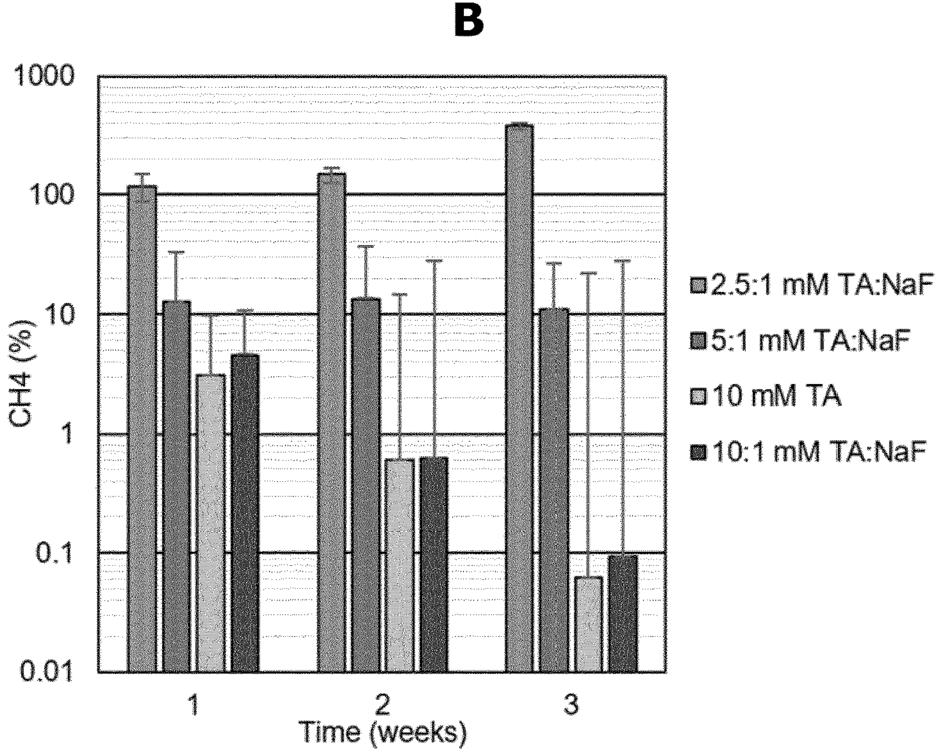

Methane ($CH_4$) emissions were measured in two distinct ways. In FIG. 3A, a headspace experiment was carried out as described in example 3 with the following exceptions.

1) 40 ml aged pig manure slurry instead of freshly mixed pig urine and pig feces was used in the reactors.
2) There was no addition of extra manure very 24 h.
3) The methane emissions were measured with a cavity ring-down spectrometer (CRDS) (Picarro, Santa Clara, CA, USA) for 4 days.

The CRDS picarro 2201-i analyzer was operated at a cavity temperature and pressure of 45° C. and 148 torr, respectively.

FIG. 3B shows the relative methane production of 12 days old pig manure slurry over three weeks. This was done by transferring the TA-NaF treated manure slurry used in example 3 to 100 mL inoculum flasks on day 12. The manure slurry was weighed before inoculation and the headspace was flushed with helium (Linde Group) prior to encapsulation. Gas from the headspace of the inoculum flasks was sampled into 6 mL vacuum sealed exetainer vials (Labco Limited, Lampeter, UK) every week the following three weeks and stored for later $CH_4$ analysis on a GC-FID. After sampling from the inoculum flasks, the pressure in the headspace was equalized with a needle.

Results

FIG. 3A shows the cumulated methane emission from aged pig manure slurry over 4 days with continuous air exchange in the headspace. FIG. 3B shows methane production from 12 days old manure slurry measured over 3 weeks in anaerobic conditions without any gas exchange in the headspace.

| Component | Relative methane production over 4 days (FIG. 3A) | Relative methane production over 3 weeks (FIG. 3B) |
|---|---|---|
| Uninhibited control | 100% | 100% |
| Tannic acid (5 mM) | 30% | 6.3% |
| Flouride (NaF) (1 mM) | | |
| Tannic acid (10 mM) | 12.6% | 0.01% |
| Flouride (NaF) (1 mM) | | |

The above results are showed in FIGS. 3A and 3B.

Conclusion

Methane production was significantly reduced when treating pig manure slurry with tannic acid and fluoride. In FIG. 3A the emission was reduced most by 10 mM TA with 1 mM NaF. FIG. 3B showed that the methane production was reduced to 0.01% of the uninhibited control when treating the manure slurry with 10 mM TA with 1 mM NaF and when treating the manure slurry with 10 mM TA. Manure treatment with 5 mM TA and 1 mM NaF also reduced the methane production significantly. It is worth noting that treatment with 2.5 mM TA and 1 mM NaF appeared to increase the methane production by 918% over the 3 weeks (not shown in table). This suggests that microbes may be able to use TA as a substrate for methane production when they were not inhibited by high TA concentrations or that low TA concentrations inhibit competing microorganisms giving an advantage to methanogens.

Example 5

Tannic Acid and Fluoride—Reduction in Odour Emissions

Aim of Example

To determine an array of volatile organic compounds (VOCs) in headspace experiments simultaneously with $NH_3$. Many of the VOCs have previously been detected from pig manure/manure slurry and assigned as key odorants.

Materials and Methods

The measurements of volatile organic compounds (VOCs) were carried out as in example 3. The VOC emissions were expressed as odor emissions using Odor Activity Values (OAV) based on odor threshold values and the total effect on odor as Sum of Odor Activity Values (SOAV).

Results

Figure 4:
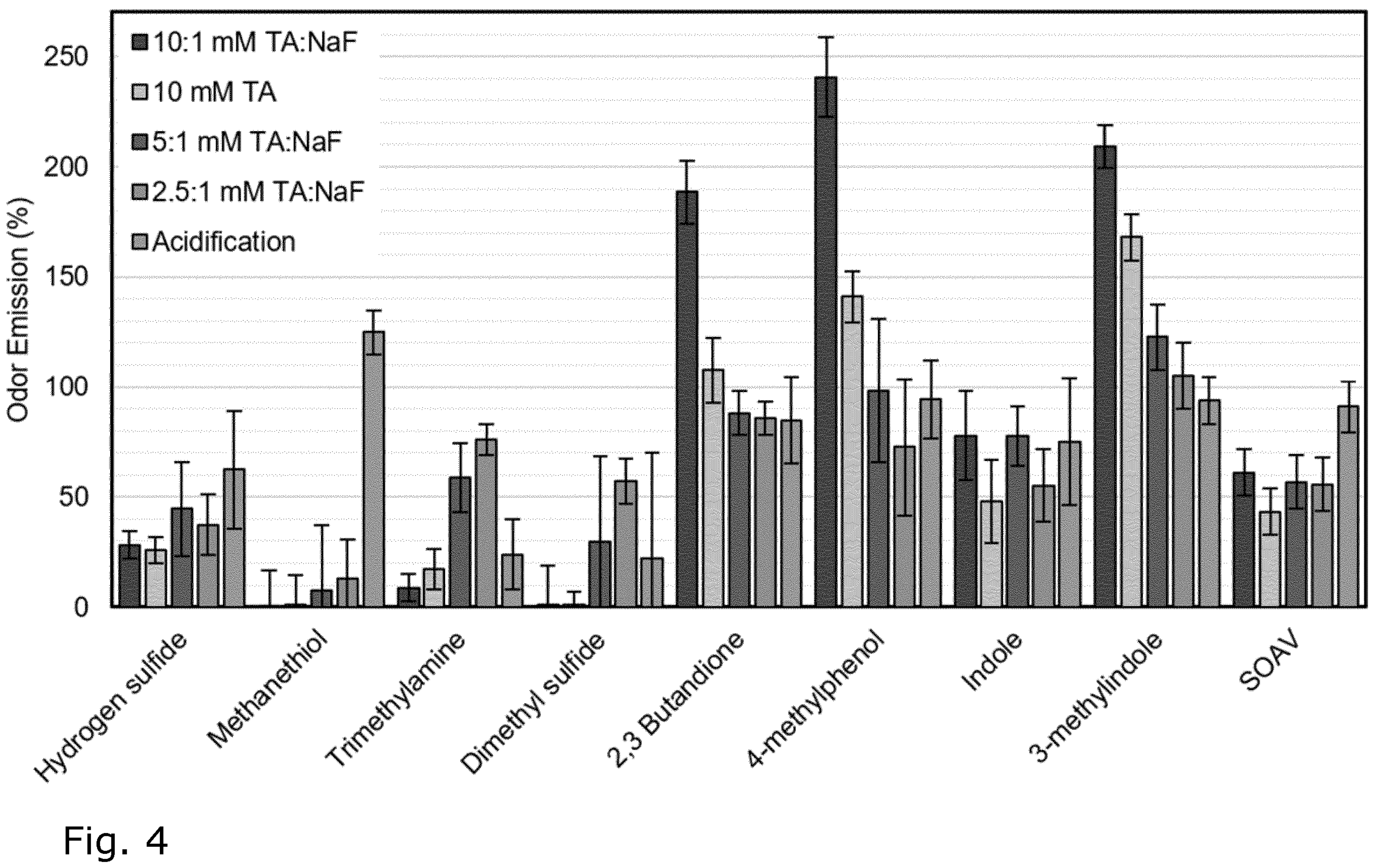
FIG. 4 shows odor emissions from various odorants relative to untreated manure slurry from fresh pig manure slurry incubated with tannic acid (TA) and sodium fluoride (NaF). Data is presented as mean±SD of the mean of triplicates. SOAV is the sum of odor activity values.

For simplicity, FIG. 4 comprises only VOCs, which contributed significantly to the Sum of Odor Activity Values (SOAV). FIG. 4 suggests a strong reduction on odor emissions mainly from reduced emissions of sulfur compounds, which was negatively correlated with TA concentration. Particularly, odor from methanethiol was reduced, influencing heavily on the SOAV. The odor emissions of 4-methylphenol and 3-methylindole were positively correlated with TA-NaF concentration, whereas acidification had no effect on these compounds. Treatment with 10 mM TA and 1 mM NaF was effective with a SOAV reduction of 38.8%. Treatment with 5 mM TA and 1 mM NaF and treatment with 2.5 mM TA and 1 mM NaF reduced SOAV by 43.2% and 44.3%, respectively. However, there was no statistical difference between any of these TA-NaF treatments. The SOAV did not change significantly when acidifying the pig manure slurry.

| Component | Relative reduction of odor as SOAV |
|---|---|
| Uninhibited control | 0% |
| Tannic acid (10 mM) | 38.8% |
| Flouride (NaF) (1 mM) | |
| Tannic acid (5 mM) | 43.2% |
| Flouride (NaF) (1 mM) | |
| Tannic acid (2.5 mM) | 44.3% |
| Flouride (NaF) (1 mM) | |
| Acidification | 0% |

Conclusion

The manure slurry treatment with TA and NaF reduced odorant emissions significantly by up to 44.3% mainly due to reduced sulfur compounds emissions. Acidification had no significant effect on odorant emissions.

Example 6

Bacterial and Archaeal Community Structure Analysis

Aim of Study

To determine the effect of TA-NaF treatment on the pig manure/manure slurry microbial community structure.

Materials and Methods

The effect of TA-NaF on microbial community structure in pig manure/manure slurry was explored with 16S rRNA gene amplicon sequencing targeting the archaeal and bacterial V4 hypervariable region. Additionally, the effect on microbial viability was investigated by plating the manure samples on chocolate agar plates supplemented with vitox and incubated anaerobically for five days at room temperature, after which the number of viable colonies were counted. Manure/manure slurry samples for sequencing and colony counting were taken in the beginning of the experiment and after three, six and twelve days, respectively, to elucidate the gradual community differentiation.

Results

The data from the 16S rRNA gene amplicon sequencing was analyzed using a principal component analysis (PCA). The results from the PCA suggests that a negative correlation between TA-NaF dose and microbial community structure change exists. The relative community change for a treatment occurred earlier for low-dose treatments and vice versa for high doses of TA-NaF. Untreated manure/manure slurry indicated early changes in community structure, however in a dissimilar way to TA-NaF treated manure/manure slurry, which confirmed a degree of microbial adaptation in TA-NaF treated manure/manure slurry. The Colony Forming Units (CFU) count after three days was highest in untreated manure/manure slurry, followed by TA-NaF treated manure/manure slurry from low to high doses. At day six and twelve more CFUs were counted for particularly, 5:1 and 10:1 mM TA:NaF treated manure/manure slurry, which is also reflected in community structure changes for this period seen from the PCA.

Conclusion

The results indicate that the addition of TA-NaF to manure slurry have a lasting influence on the microbial community structure. The results from the PCA suggests that, compared to untreated manure slurry, the use of TA-NaF changes which bacteria thrive in the manure/manure slurry, probably due to the inhibition of ureolytic bacteria which are then out-competed. Increasing the concentration of TA reduces the overall microbial activity and the number of viable cells immediately after addition. However, TA-NaF treatment does not make the environment uninhabitable at the concentrations tested in these experiments, and a new microbial community is able to develop over time. Thus, the anti-ureolytic effect of the treatment does not appear to be only an antibacterial effect but rather an inhibition of urease activity.

Example 7

Substitution of Tannic Acid (TA) with Mixed Tannins (MTA)

Aim of Example

To test if tannic acid (TA) can be partly replaced with unseparated/unpurified mixtures of tannins (MTA) in order to decrease the amount of TA needed to inhibit ureolysis in pig manure slurry. A decrease in TA amounts should lower the overall price for applying the technology.

Materials and Methods

Tannic acid, sodium fluoride, NaOH, HCl and $H_3BO_3$ were purchased from Sigma-Aldrich. The mixed tannins (75% tannins) used in this study (VINOFERM TANNOROUGE) were purchased from Brouwland. The product contains tannins from chestnut.

Total ammoniacal nitrogen (TAN) was measured in pig manure slurry using the Kjeldahl method. This method consists of adding 32% NaOH to the manure sample in order to turn all $NH_4^+$ in the sample to $NH_3$. The sample is then heated in a closed system causing the $NH_3$ to evaporate into a trap containing $H_3BO_3$ forming $NH_4[B(OH)_4]$. The remaining acid is then back-titrated with dilute HCl to give the concentration.

The pig manure slurry was made fresh on the day of measurement by mixing 10 g of feces with 30 ml of urine. Vials of approximately 4.5 ml of manure slurry were prepared. To each vial 0.5 ml of either 30 mM TA and 10 mM NaF or 50 mM TA and 10 mM NaF was added. Vials containing 0.5 ml of either 51 mg/ml MTA (equal to 30 mM TA on a mass basis) or 85 mg/ml MTA (equal to 50 mM TA on a mass basis) with 10 mM TA and 10 mM NaF were also prepared. Controls were vials of 4.5 ml manure slurry with 0.5 ml $H_2O$ or 10 mM NaF. After mixing inhibitors and pig manure slurry the vials were sealed and incubated at 25° C. with shaking for 5 h. After incubation, the ureolysis reaction was rapidly quenched by addition of 8 ml 32% NaOH before the sample was transferred to the Kjeldahl instrument for measurements.

Results

| Component | Reduction in concentration of $NH_3$ |
|---|---|
| Uninhibited control | 0% |
| 3 mM TA + 1 mM NaF | 50.4 ± 6% |
| 5 mM TA + 1 mM NaF | 53.2 ± 5% |
| 3 mM MTA + 1 mM NaF + 1 mM TA | 38.4 ± 3% |
| 5 mM MTA + 1 mM NaF + 1 mM TA | 57.3 ± 6% |
| 1 mM NaF | 17.7 ± 4%. |

Conclusion

Replacing most of the TA with an unspecified tannin extract (MTA) from chestnut produced inhibition of ammonia synthesis through ureolysis. The lowest amount of MTA tested led to reduced inhibition compared to pure TA (38.4% vs. 50.4% reduction of $NH_3$) whereas the highest amount of MTA tested here led to slightly increased inhibition compared to pure TA (57.3% vs. 53.2% reduction of $NH_3$).

Thus, it seems feasible that TA can, to some extent, be replaced by other, cheaper, sources of tannins/polyphenols. Optimization is still required as is tests of other sources of tannins/polyphenols.

Example 8

Treatment of Half Dry Matter (Liquid Fraction)—Separation of Manure Slurry

Aim of Example

To test if removal of part of the dry matter in manure slurry decreases the amount (and thus the cost) of tannic acid (TA) needed for efficient inhibition of ureolysis with TA and sodium fluoride (NaF) mixtures.

Materials and Methods

Tannic acid and sodium fluoride, NaOH, HCl and $H_3BO_3$ were purchased from Sigma-Aldrich.

Total ammoniacal nitrogen (TAN) was measured in pig manure slurry using the Kjeldahl method. This method consists of adding 32% NaOH to the manure sample in order to turn all $NH_4^+$ in the sample to $NH_3$. The sample is then heated in a closed system causing the $NH_3$ to evaporate into a trap containing $H_3BO_3$ forming $NH_4[B(OH)_4]$. The remaining acid is then back-titrated with dilute HCl to give the concentration.

The pig manure slurry was made fresh on the day of measurement by mixing 10 g of feces with 30 ml of urine. Manure separation was simulated by mixing 10 g of feces with 60 ml of urine for a ratio of 1:6 w:V.

For the "normal" ratio or unseparated manure slurry (1:3) 4.5 ml manure was placed in vials. Then 0.5 ml of TA (50 mM) and NaF (10 mM) were added to the manure slurry. For the separated manure slurry (1:6) 4.5 ml were mixed with 0.5 ml of TA (25 mM) and NaF (10 mM).

Controls were vials of 4.5 ml manure slurry with 0.5 ml $H_2O$ at either 1:3 or 1:6 w:V ratios of feces:urine. After mixing inhibitors and pig manure slurry the vials were sealed and incubated at 25° C. with shaking for 5 h. After incubation, the ureolysis reaction was rapidly quenched by addition of 8 ml 32% NaOH before the sample was transferred to the Kjeldahl instrument for measurements.

Results

Compared to the uninhibited manure slurry controls, the unseparated (1:3) manure slurry reduced the concentration of $NH_3$ with 53±5% while the separated (1:6) manure slurry reduced the concentration of $NH_3$ with 63±0.5%.

Conclusion

The preliminary results presented above indicates that the separation of manure slurry (so that less dry matter is present which needs to be precipitated by TA) indeed leads to an increased inhibition of ureolytic ammonia production with smaller concentrations of TA.

Example 9

Inhibition of Human Pathogenic Bacterium by Tannic Acid and Fluoride

Aim of Study

To show that the pathogenic ureolytic bacterium *K. pneumoniae*, which is known to cause urinary tract infections, is inhibited by combinations of tannic acid and fluoride.

Materials and Methods

Bacteria, growth-medium and pH-based urease activity assay.

Same procedure as described in example 1.

Results

The urease activity assay clearly show that, tannic acid in concentrations of 0-0.8 mM inhibits ureolytic activity of *K. pneumoniae* to a small degree only (0-12%). When 0.3 mM fluoride is added to the tannic acid solution, the inhibition is dramatically enhanced (40-100%). In contrast, 0.3 mM fluoride alone inhibits ureolysis by 14.7%. The results have been plotted in FIG. 5 for overview.

Conclusion

The preliminary results described here supports that those pathogenic bacteria which use ureolysis (hydrolysis of urea to ammonia) to infect humans can be inhibited by combinations of tannic acid and fluoride. Other pathogenic bacteria known to be ureolytic includes *Helicobacter pylori, Streptococcus salivarius* and *Proteus mirabilis.*

Example 10

Substitution of Tannic Acid (TA) with Mixed Tannins (MTA), Chlorogenic Acid (CA), Lignosulfonic Acid (LS), Lignin (L), Chitosan Low Molecular Weight (CLMW) or Green Tea Extract (GTE)

Aim of Example

To further test if tannic acid (TA) can be fully or partly replaced with either unseparated/unpurified mixtures of tannins (MTA or GTE) or purified clorogenic acid (CA), lignosulfonic acid (LS), lignin (L) or chitosan low molecular weight (CLMW) in order to decrease the amount of TA needed to inhibit ureolysis in pig manure slurry. A decrease in TA amounts could lower the overall price for applying the technology.

Materials and Methods

Tannic acid (TA), sodium fluoride (NaF), chlorogenic acid (CA), lignosulfonic acid (LA), lignin (L), chitosan low molecular weight (CLMW), NaOH, HCl and $H_3BO_3$ were purchased from Sigma-Aldrich. The mixed tannins (75% tannins) used in this study (VINOFERM TANNOROUGE) were purchased from Brouwland. The product contains tannins from chestnut. The green tea extract was purchased from Slimming Labs (Groeningen, Netherlands) and consists of 90% polyphenols of which 40% are epigallocatechin gallate. Total ammoniacal nitrogen (TAN) was measured in pig manure slurry using the Kjeldahl method as described in example 2 and example 7. The various compounds were tested as described for MTA in example 7 using appropriate concentrations.

Initial screenings were done in duplicate and the results are given as the average of the two measurements with no standard deviation (SD). The remaining measurements were done in triplicate and are given as mean±SD.

Results

| Component | Concentration | Reduction in ammonia production (Mean ± SD) |
|---|---|---|
| Uninhibited | — | 0 ± 4% |
| Tannic acid (TA) | 5 mM (8.5 mg/ml) | 18 ± 1.3% |
| NaF | 1 mM | 9 ± 1.0% |
| TA + NaF | 5 mM + 1 mM | 53 ± 1.0% |
| MTA + NaF + TA | 6.8 mg/ml + 1 mM + 1 mM | 64 ± 2.6% |
| CA | 5 mM (2.3 mg/ml) | 6% |
| CA + NaF | 5 mM + 1 mM | 58% |
| CA + NaF + TA | 4 mM + 1 mM + 1 mM | 60% |
| LS | 8.5 mg/ml | 7% |
| LS + NaF | 8.5 mg/ml + 1 mM | 37% |
| LS + NaF + TA | 6.8 mg/ml + 1 mM + 1 mM | 42-51% |
| LS + NaF + TA | 3 mg/ml + 1 mM + 1 mM | 47 ± 2.8% |
| LS + NaF + TA | 2 mg/ml + 1 mM + 1 mM | 48 ± 4.5% |
| L | 8.5 mg/ml | 0% |

-continued

| Component | Concentration | Reduction in ammonia production (Mean ± SD) |
|---|---|---|
| L + NaF | 8.5 mg/ml + 1 mM | 7% |
| L + NaF + TA | 6.8 mg/ml + 1 mM + 1 mM | 37% |
| CLMW | 2 mg/ml in 10 mM HCl | 13% |
| CLMW + NaF | 2 mg/ml in 10 mM HCl + 1 mM | 66% |
| CLMW + NaF + TA | 1 mg/ml in 10 mM HCl + 1 mM + 1 mM | 59% |
| GTE | 8.5 mg/ml | 57% |
| GTE + NaF | 8.5 mg/ml + 1 mM | 72% |
| GTE + NaF + TA | 6.8 mg/ml + 1 mM + 1 mM | 76% |
| GTE | 5 mg/ml | 36 ± 6.5% |
| GTE + NaF | 5 mg/ml + 1 mM | 66 ± 3.4% |
| GTE + NaF + TA | 5 mg/ml + 1 mM + 1 mM | 76 ± 2.8% |
| GTE | 3 mg/ml | 3 ± 7.2% |
| GTE + NaF | 3 mg/ml + 1 mM | 34 ± 6.9% |
| GTE + NaF + TA | 3 mg/ml + 1 mM + 1 mM | 37 ± 3.3% |

The results presented above indicate that:

2.3 mg/ml CA with 1 mM NaF yields approximately the same reduction in ammonia production as 8.5 mg/ml TA with 1 mM NaF (58% vs. 53%).

LS is not able to replace TA but 2 mg/ml LS with 1.7 mg/ml TA and 1 mM NaF yields approximately the same reduction in ammonia as 8.5 mg/ml TA with 1 mM NaF (48% vs. 53%) while lignin is less effective. Increasing the amount of LS does not appear to lead to further effect on the ammonia production (at least up to 8.5 mg/ml).

CLMW at 1-2 mg/ml in 10 mM HCl with 1 mM NaF and with/without 1 mM TA reduces ammonia production with 59-66%.

The optimal amount of GTE is 5 mg/ml with 1 mM NaF or with 1 mM NaF and 1 mM TA which reduces ammonia production with 66% and 76% respectively.

Conclusion

As observed with MTA in example 7 it is possible to replace/substitute some/all of the TA with mixes of tannins i.e. MTA and GTE as well as other compounds i.e. CA, LS, CLMW known to induce cell membrane leakage and/or cause protein precipitation and still obtain the same or better reduction in ammonia production. Reduction in mass of compound which needs to be added to the manure should lower the price as well as make the technology more practical to use.

Example 11

Demonstration of Synergistic Inhibition of Ammonia Production in Complex Sample and in Pure Culture by Tannic Acid with Acetohydroxamic Acid or Mixtures of Acetohydroxamic Acid and Sodium Fluoride Aim of Example Further compounds identified in example 1 were combined with tannic acid to test for potential synergistic inhibition of ammonia production in pure *K. pneumoniae* culture and pig manure slurry. Of these compounds acetohydroxamic acid (AHA) was found to exhibit synergistic inhibition of ammonia production in pure culture with tannic acid (TA) similar to what was observed with sodium fluoride in example 2. The compound was further tested in pig manure individually and in mixture with sodium fluoride.

Materials and Methods

Kjeldahl Measurements.

Tannic acid, sodium fluoride, acetohydroxamic acid, NaOH, HCl and $H_3BO_3$ were purchased from Sigma-Aldrich. Total ammoniacal nitrogen (TAN) was measured in pig manure slurry using the Kjeldahl method. Total ammoniacal nitrogen (TAN) was measured in pig manure slurry using the Kjeldahl method as described in example 2.

Bacteria, Growth-Medium and pH-Based Urease Activity Assay.

Same procedure as described in example 1.

Results

The results from the screening of AHA and TA in pure *K. pneumonia* culture at different combinations are presented in the following table.

| Component | Concentration | Reduction in ureolytic activity |
|---|---|---|
| Uninhibited | | 0 ± 6% |
| TA | 0.05 mM | 16 ± 5% |
| TA | 0.1 mM | 9.4 ± 3% |
| TA | 0.2 mM | 3.9 ± 6% |
| AHA | 0.2 mM | 14 ± 6% |
| AHA + TA | 0.2 mM + 0.2 mM | 48 ± 4% |
| AHA | 0.3 mM | 29.4 ± 1% |
| AHA + TA | 0.3 mM + 0.05 mM | 93 ± 2% |
| AHA + TA | 0.3 mM + 0.1 mM | 89 ± 3% |

The results from the Kjeldahl measurements of AHA/NaF with TA in different combinations treating pig manure slurry, are presented in the following table.

| Component | Concentration | Reduction in ammonia production (Mean) |
|---|---|---|
| Uninhibited | | 0 ± 4% |
| TA | 3 mM | 0 ± 4% |
| TA | 5 mM | 18 ± 1.3% |
| NaF | 1 mM | 9 ± 1.0% |
| TA + NaF | 3 mM + 1 mM | 35 ± 6.0% |
| TA + NaF | 5 mM + 1 mM | 53 ± 1.0% |
| AHA | 0.5 mM | 14 ± 2.3% |
| AHA + TA | 0.5 mM + 2.5 mM | 42 ± 2.5% |
| AHA | 1 mM | 24 ± 3.4% |
| AHA + TA | 1 mM + 2.5 mM | 45 ± 2.7% |
| AHA + TA | 1 mM + 5 mM | 62 ± 1.3% |
| AHA + NaF + TA | 0.5 mM + 0.5 mM + 2.5 mM | 55 ± 3.1% |
| AHA + NaF + TA | 1 mM + 1 mM + 2.5 mM | 69 ± 1.7% |

Acetohydroxamic acid and TA show clear synergistic inhibition of ureolytic activity in pure culture where 0.3 mM AHA (29.4%) and 0.05 mM TA (16%) when applied together reduces ureolytic acitivity by 93%.

This synergy is retained when the compounds are used in pig manure slurry. A solution of 0.5 mM AHA reduces ammonia production by 14% while the combination of 0.5 mM AHA and 2.5 mM TA reduces ammonia by 42%. AHA appears to be slightly more effective than NaF but at higher concentrations of AHA no additional effect is gained. However, if AHA and NaF is combined, e.g. 0.5 mM or 1 mM of each and then added to 2.5 mM TA the overall reduction in ammonia production in pig manure slurry is 55% and 69%, respectively.

Therefore, mixtures of AHA and NaF is one way of reducing the amount of TA without lowering the level of ammonia inhibition. Additionally, the mixtures may be considered in cases where the concentrations of AHA or NaF alone cannot be increased due to price or toxicity.

Conclusion

AHA in combination with TA is shown to exhibit a synergistic inhibition of ureolytic activity in pure culture as well as in more complex media. Thus, AHA may partly or completely replace NaF in the composition.

The invention claimed is:

1. A fertilizer composition, comprising:

(a) urea; and (b) a mixture comprising one or more tannins; and fluoride selected from the group consisting of sodium fluoride (NaF), potassium fluoride (KF), lithium fluoride (LiF) and combinations thereof;

wherein the molar ratio between the one or more tannins and the fluoride is 100:1-1:1.

2. The composition according to claim 1, wherein said tannin is tannic acid.

3. The composition according to claim 1, wherein:

the fluoride is NaF and the NaF is 0.01 mM-1 M; and the tannin is tannic acid and the tannic acid is 0.01 mM-0.5 M.

4. The composition according to claim 1, wherein said composition is in a dry state or in a solution.

5. The composition according to claim 1, further comprising a binder.

6. The composition according to claim 1, further comprising:

acetohydroxamic acid (AHA).

7. The composition according to claim 1, wherein the molar ratio between the one or more tannins and the fluoride is 50:1-1:1.

8. The composition according to claim 1, comprising 2-99% (w/w) urea.

9. The composition according to claim 1, comprising 20-80% (w/w) urea.

10. The composition according to claim 1, comprising 4-90% (w/w) nitrogen.

11. The composition according to claim 1, wherein the molar ratio between the one or more tannins and the fluoride is 10:1-3:1.

12. The composition according to claim 1, wherein the molar ratio between the one or more tannins and the fluoride is 15:1-3:1.

* * * * *